United States Patent
Kimura et al.

(10) Patent No.: US 12,407,205 B2
(45) Date of Patent: Sep. 2, 2025

(54) ROTATING ELECTRICAL MACHINE

(71) Applicant: MAHLE International GmbH, Stuttgart (DE)

(72) Inventors: Masamitsu Kimura, Shizuoka (JP); Reiji Sato, Shizuoka (JP); Makoto Serizawa, Shizuoka (JP)

(73) Assignee: Mahle International GmbH (DE)

( * ) Notice: Subject to any disclaimer, the term of this patent is extended or adjusted under 35 U.S.C. 154(b) by 264 days.

(21) Appl. No.: 17/984,234

(22) Filed: Nov. 9, 2022

(65) Prior Publication Data

US 2023/0145116 A1 May 11, 2023

(30) Foreign Application Priority Data

Nov. 10, 2021 (JP) .................................. 2021-183712

(51) Int. Cl.
*H02K 3/28* (2006.01)
*H02K 3/52* (2006.01)
*H02K 21/22* (2006.01)

(52) U.S. Cl.
CPC .............. *H02K 3/28* (2013.01); *H02K 3/522* (2013.01); *H02K 21/22* (2013.01); *H02K 2203/06* (2013.01)

(58) Field of Classification Search
CPC ............ H02K 3/28; H02K 3/18; H02K 3/522; H02K 21/22; H02K 2203/06
USPC .............. 310/184, 185, 153, 71; 322/49, 52; 123/599, 149 D
See application file for complete search history.

(56) References Cited

U.S. PATENT DOCUMENTS

| | | | | |
|---|---|---|---|---|
| 5,017,822 A | * | 5/1991 | Shimizu | H02K 3/28 310/74 |
| 6,137,198 A | * | 10/2000 | Kawamura | H02K 3/522 310/71 |
| 6,333,579 B1 | * | 12/2001 | Hirano | H02K 1/146 310/43 |
| 6,836,048 B2 | * | 12/2004 | Morimatsu | H02K 3/28 310/179 |

(Continued)

FOREIGN PATENT DOCUMENTS

| | | | | |
|---|---|---|---|---|
| JP | H02254950 A | | 10/1990 | |
| JP | 2015171239 | * | 9/2015 | ............... H02K 3/18 |
| JP | 2020065350 | * | 4/2020 | ............... H02K 3/18 |

OTHER PUBLICATIONS

English abstract for JP-H02-254950.

*Primary Examiner* — Burton S Mullins
(74) *Attorney, Agent, or Firm* — Fishman Stewart PLLC

(57) ABSTRACT

A rotating electrical machine may include a stator and a rotor. The stator may include a plurality of iron cores and a plurality of windings. The plurality of windings may include a first phase winding, a second phase winding, and a third phase winding connected in a delta connection. The first phase winding, the second phase winding, and the third phase winding may each be connected in series with a respective crossover wire. The first and third phase windings may be wound in a first winding direction. The second phase winding may be wound in a second winding direction. A first crossover wire connecting the first phase winding and/or a third crossover wire connecting the third phase winding may be arranged on a first side of the stator. A second crossover wire connecting the second phase winding may be arranged on a second side of the stator.

16 Claims, 7 Drawing Sheets

(56) References Cited

U.S. PATENT DOCUMENTS

| | | | | |
|---|---|---|---|---|
| 7,187,094 B1* | 3/2007 | Walker | ............... | H02K 3/522 |
| | | | | 310/71 |
| 7,514,834 B2* | 4/2009 | Takeuchi | ............... | H02K 21/22 |
| | | | | 310/184 |
| 8,040,003 B2* | 10/2011 | Takahashi | ............... | H02P 9/30 |
| | | | | 310/198 |
| 9,537,366 B2* | 1/2017 | Hikita | ............... | H02K 3/345 |
| 9,608,486 B2* | 3/2017 | Sahara | ............... | H02K 3/28 |

\* cited by examiner

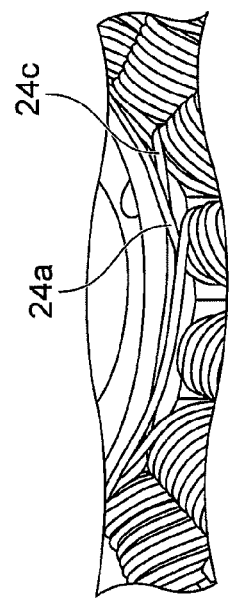
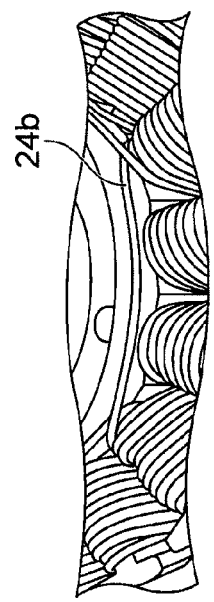
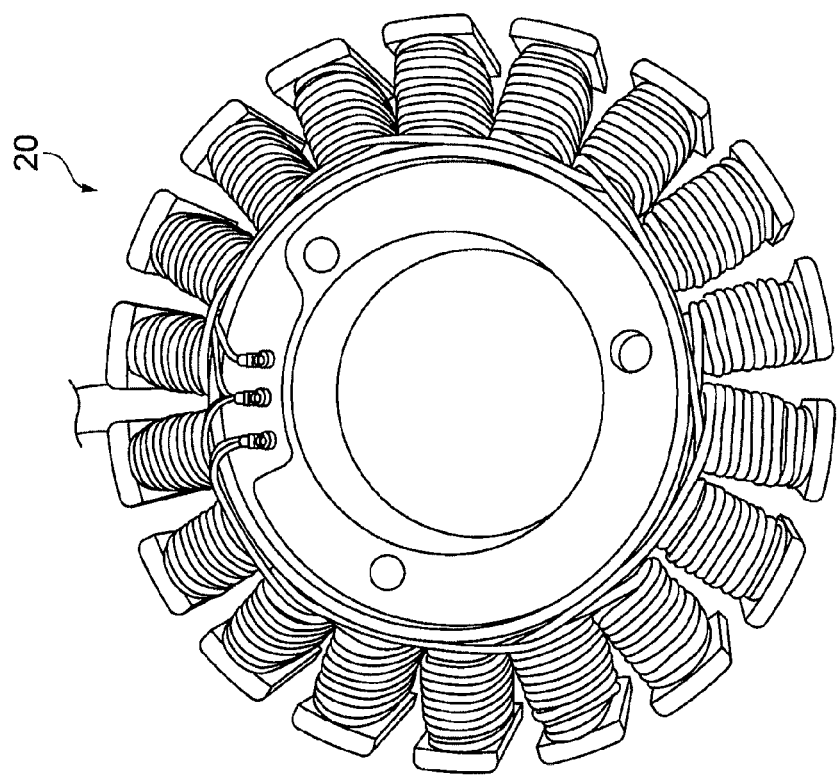

ROTATING ELECTRICAL MACHINE

CROSS-REFERENCE TO RELATED APPLICATIONS

This application claims priority to Japanese Patent Application No. JP 2021-183712, filed on Nov. 10, 2021, the contents of which is hereby incorporated by reference in its entirety.

TECHNICAL FIELD

The present invention relates to a rotating electrical machine and relates more specifically to a three-phase rotating electrical machine utilizing a delta connection as the connection system.

BACKGROUND

A three-phase rotating electrical machine of the related art includes a stator and a corresponding rotor having permanent magnets alternately arranged along the circumference for different SN magnetism; and a three-phase coil is wound around a plurality of iron cores arranged along the circumference on the stator.

CITATION LIST

Patent Literature

Patent Literature 1: JP H2-254950 A

The wire connection system for three-phase coils includes two connection systems such as a star connection and a delta connection, and consideration is given to a stator coil wiring utilizing the delta connection system.

In the delta connection stator utilized in the three-phase rotating electrical machine of the related art, as shown in FIG. 6, the three-phase coil is wound on iron cores arrayed along the circumference in the sequence shown in FIG. 7. The plurality of coils is respectively serially connected by the crossover wires for each phase of coils A, B, and C. First, the U-phase coil A is wound in the sequence A1-A2-A3-A4-A5-A6; next, the V phase coil B is wound in the sequence B1-B2-B3-B4-B5-B6; and the W phase coil C is wound in the sequence C1-C2-C3-C4-C5-C6. In the sequence shown in FIG. 7, all of the phase coils are wound in the same direction. In the coil termination process in this case, A1, C6 are connected at a contact point X; A6, B1 are connected at a contact point Y; and B6, C1 are connected at a contact point Z.

However, when all coils are wound in the same direction, the contact point X is arranged in proximity to A1, C6 while the contact point Y is arranged physically separate from A6, B1 and the contact point Z is arranged physically separate from B6, C1. Assembly is therefore difficult and the insulation is also difficult to maintain. The separated contact points for example must be treated with adhesive impregnation due to unstable floating of wiring and wiring mistakes are prone to occur.

FIG. 8A is a drawing showing an outer view of the delta connection stator of the related art on which coils are wound. FIG. 8B is an enlarged outer view of one surface. In the delta connection stator of the related art as shown in FIGS. 8A and 8B, the crossover wires connecting each coil are drawn along the same surface. The crossover wires arranged on the same surface overlap each other, and the location with the three crossover wires placed densely together increases the thickness. Such increase in the thickness does not satisfy the demands in recent years for device downsizing. For example, when there are limits on the thickness of the stator in FIGS. 8A and 8B due to the device structure, wiring must be performed during manufacturing with great caution at the location with the crossover wires placed densely together and the wiring is therefore not easy to perform.

Unlike the wiring system of the related art, Patent Literature 1 proposes winding just one of the three-phase coils in the reverse winding direction. However, in the method described in Patent Literature 1, the coil is still wound along the same surface and therefore there are the following problems.

The structure of the crossover wire of the delta connection stator of the related art is shown in FIG. 9A, and the structure of the crossover wire of Patent Literature 1 is shown in FIG. 9B. In the structure of the related art, the winding direction for all phases is the same as shown in FIG. 9A so the crossover wires are wired in the same way on all the iron cores. However, in the structure in Patent Literature 1 as shown in FIG. 9B, a coil of just one of the three-phase coils is wound in the reverse winding direction so that the crossover wire of the reversely wound coil is arranged at a slant state.

First, in the structure of Patent Literature 1, the slanted crossover wire interferes with winding coils on adjacent iron cores. The winding must be performed for each phase, however in the structure of Patent Literature 1, the phase for the second winding is performed in the reverse direction so that the slanted crossover wire interferes with the winding for the coil of the phase for the last winding.

Further, in the structure of Patent Literature 1 as shown in FIG. 9B, there is a location where crossover wires of another phase are in contact with the slanted crossover wire. Since the slanted crossover wire is pulled to the opposite surface while contacting the crossover wires of another phase, the tension applied to the contact location causes rubbing to occur so that damages possibly occurs on the enamel coating of the copper wire. When the coating of the copper wire is damaged, the insulation might be impossible to maintain. Electrical shorts might occur in that case at the contact locations.

In view of the aforementioned problems, the present invention therefore has the object of providing a rotating electrical machine that maintains a high degree of insulation for the copper wire and facilitates the wiring during manufacturing.

SUMMARY

To resolve the aforementioned problems, the rotating electrical machine of the present invention includes a stator having a plurality of iron cores arranged along the circumference and windings wound on each of the plurality of iron cores, and a rotor having permanent magnets arranged to have different magnetism along the circumference, in which the windings include a first phase winding, a second phase winding, and a third phase winding connected in a delta connection, each phase winding connected in series with a crossover wire, the winding direction of the first phase winding and the third phase winding is the first winding direction, the winding direction of the second phase winding is the second winding direction which is reverse to the first winding direction, and the crossover wire connecting the first phase winding and the crossover wire connecting the third phase winding are arranged on the first side of the stator, and the crossover wire connecting the second phase winding is arranged on the second surface opposite the first side.

According to this aspect, a rotating electrical machine for maintaining a high degree of insulation for the copper wire and facilitating the wiring during manufacture is able to be provided.

In the rotating electrical machine described in [1] above, a first terminal of the serially connected first phase winding and a second terminal of the serially connected third phase winding may be connected; and a second terminal of the serially connected second phase winding and a second terminal of the serially connected first phase winding may be connected; and a first terminal of the serially connected third phase winding and a first terminal of the serially connected second phase winding may be connected.

According to this aspect, the rotating electrical machine is able to be handled as the rotating electrical machine that is electrically the same as that of the related art even in the reverse winding direction.

In the rotating electrical machine described in [2], the first side may include a connection area for contact points where the two terminals for the first phase winding, the two terminals for the second phase winding, and the two terminals for the third phase winding are connected respectively, and a lead wire connecting to an external section.

According to this aspect, the number of conducting wires that are utilized to span adjacent iron cores and reach connection points is able to be reduced.

In the rotating electrical machine described from [1] to [3] above, the rotating electrical machine may be configured as a generator to generate electromotive force in the windings by rotation of the rotor.

According to this aspect, a generator for maintaining a high degree of insulation for the copper wire and facilitating the wiring during manufacture is able to be provided.

To resolve the aforementioned problems, the stator of the present invention has a plurality of iron cores arranged along the circumference and windings wound on each of the plurality of iron cores, in which the windings include a first phase winding, a second phase winding, and a third phase winding connected in a delta connection, each phase winding connected in series with a crossover wire, the winding direction of the first phase winding and the second phase winding is the first winding direction, the winding direction of the third phase winding is the second winding direction which is reverse to the first winding direction, and the crossover wire connecting the first phase winding and the crossover wire connecting the second phase winding are arranged on the first side of the stator, and the crossover wire connecting the third phase winding is arranged on the second surface opposite the first side.

According to this aspect, a stator utilized in a rotating electrical machine that maintains a high degree of insulation for the copper wire and facilitates the wiring during manufacture is able to be provided.

BRIEF DESCRIPTION OF THE DRAWINGS

FIGS. 5A through 5C show the winding structure on the stator for the generator of the present embodiment.

FIG. 5A shows an external view of the stator on which the coil is wound.

FIG. 5B shows an enlarged fragmentary external view of the A side of the stator.

FIG. 5C shows an enlarged fragmentary external view of the B side of the stator.

FIG. 8A shows an outer view of the delta connection stator of the related art on which coils are wound.

FIG. 8B shows an enlarged outer view of one surface of the stator in FIG. 8A.

FIG. 9A shows the structure of the crossover wire of the delta connection stator of the related art.

FIG. 9B shows the structure of the crossover wire of Patent Literature 1.

DETAILED DESCRIPTION

Figure 1B:
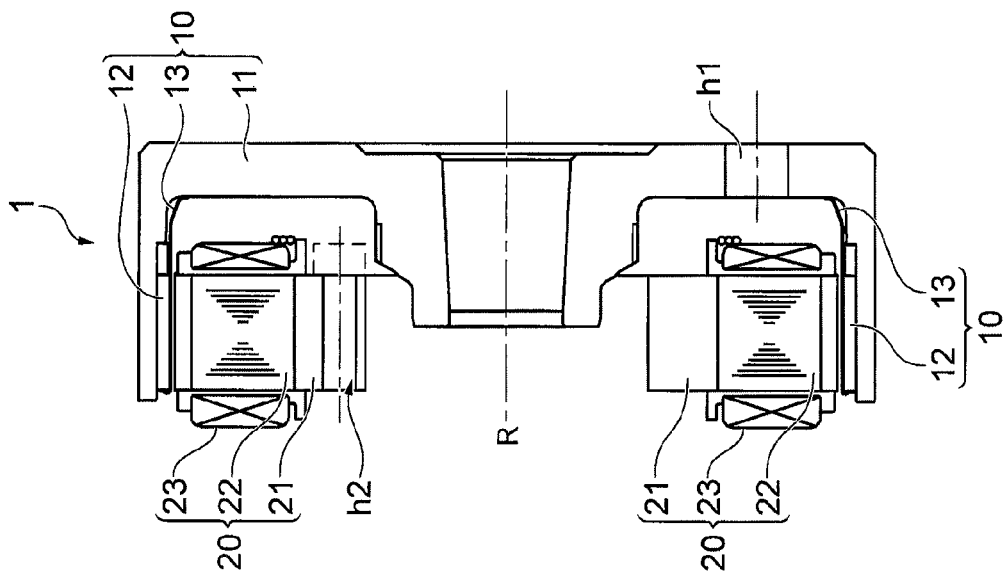
FIG. 1B shows a cross-sectional view of the generator in FIG. 1A.

Specific examples of the embodiments of the present invention are described with reference to the drawings. In the following description, common structural elements of the embodiments are designated with identical reference numerals and redundant descriptions are omitted. In the following embodiments, a generator is utilized as an example of the rotating electrical machine.

Figure 1A:
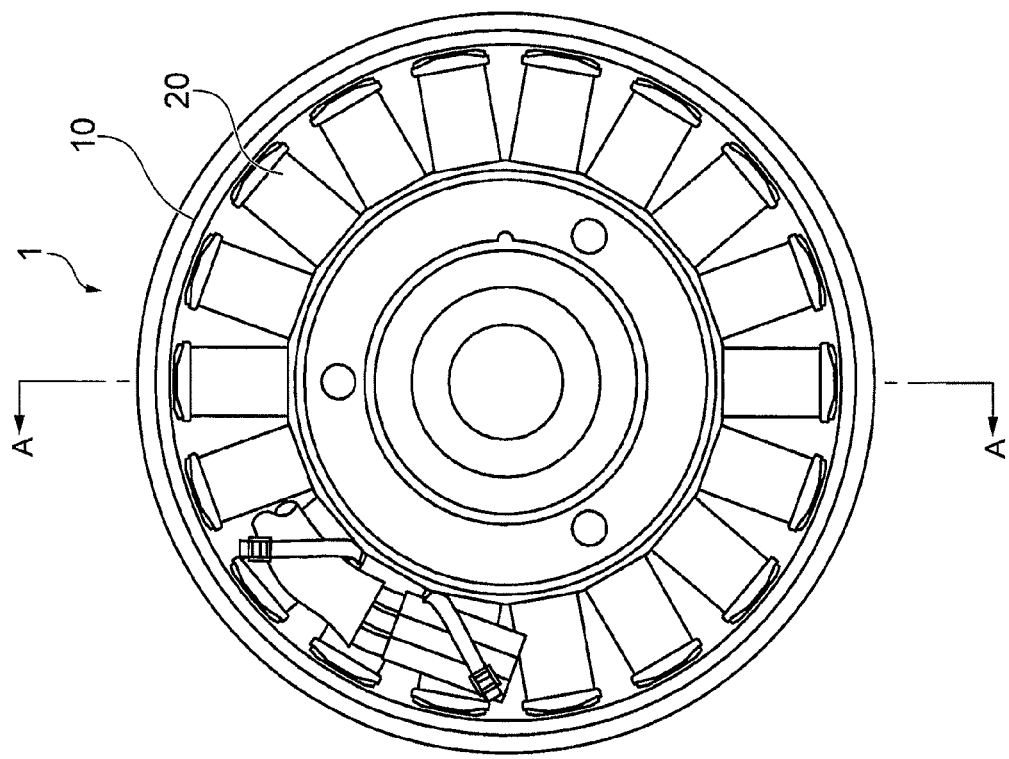
FIG. 1A shows a front side view of the overall structure of the generator of the present embodiment.

FIGS. 1A and 1B show drawings showing the overall structure of the generator of the present embodiments. FIG. 1A is a drawing showing the generator as seen from the front side, and FIG. 1B is a drawing showing a cross-section of the generator in FIG. 1A.

A generator 1 as shown in FIGS. 1A and 1B has a structure including a rotor 10 and a stator 20 arranged coaxially. The generator 1 of the present embodiment is an outer rotor type generator in which the rotor 10 is configured to enclose the stator 20 at the edge of the rotor 10.

The rotor 10 includes a rotor body 11, a magnet 12, and a magnet case 13. The rotor body 11 is configured to allow rotation of the rotor 10 centering on a rotation axis R for insertion of a rotary member such as a crankshaft. In other words, when the crankshaft rotates, the rotor 10 is interconnected to also rotate centering on the rotation axis R A cooling hole h1 is also formed on the rotor body 11.

The magnet 12 is arranged circumferentially along the edge of the rotor body 11 in a state held within a magnet case 13. The magnet 12 is a permanent magnet arranged to have different magnetism along the circumference. The magnet 12 is installed for example along the circumference prior to magnetization and then magnetized such that the N poles and S poles are alternately arrayed at fixed intervals.

The stator 20 includes a stator body 21, an iron core 22, and a coil (winding) 23. The coil 23 can be configured from a conductive member covered by an insulation coating on the periphery. The iron core 22 is formed to protrude at the outer circumference of the stator body 21 and the coil 23 is wound on the iron core 22. The stator body 21 has a hole h2 for insertion of a fixation screw, etc., to fix the generator 1.

The generator 1 is configured from the magnet 12 of the rotor 10, and the coils 23 of the stator 20 wound on the iron core 22, facing each other. In the generator 1 configuration, the rotation of the rotor 10 centering on the rotation axis R due to a rotary member such as a crankshaft results in rotation of the magnet 12 alternately magnetized at the N and S poles along the circumference. The rotation of the rotor 10 results in a change in the magnetic field formed between the magnet 12 and the iron core 22 of the stator 20; and an electromotive force is generated in the coil 23 wound on the iron core 22 due to the electromagnetic induction effect so that electricity is generated by the flow of induced current.

In the generator of the present embodiment, the structure of the coil wound on the stator renders the effect that a high degree of insulation is maintained for the copper wire and facilitates the wiring during manufacture. The structure of the coil wound on the stator is described further.

The stator 20 utilized in the generator of the present embodiment has iron cores 22 with the three-phase coil 23 wound in a delta connection. In the present embodiment, a description is given utilizing a three-phase 18 pole stator as an example, however there is no particular limit on the number of poles.

Figure 2:
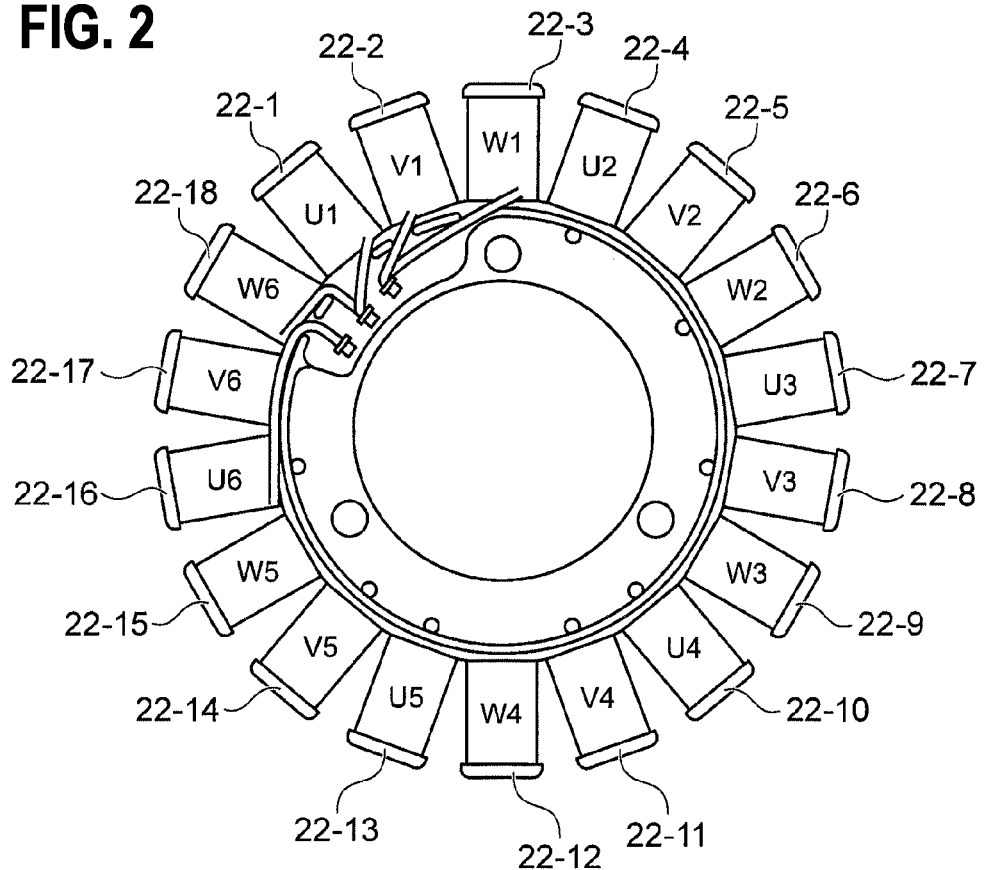
FIG. 2 shows the stator prior to winding the coil.
Figure 3:
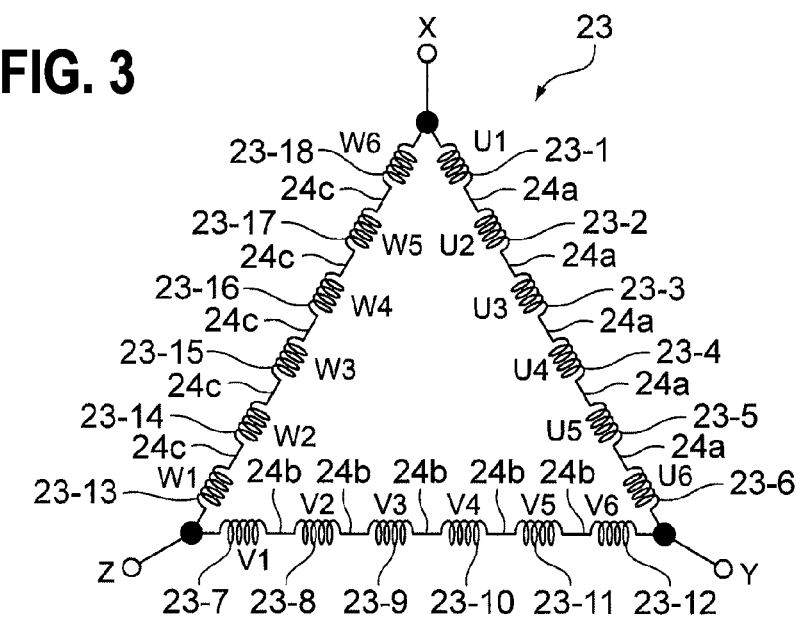
FIG. 3 shows the structure of the coil to be wound on the stator.

FIG. 2 is a drawing showing the stator prior to winding the coil of the present embodiment. FIG. 3 is a drawing showing the structure of the coil wound on the stator of the present embodiment.

FIG. 2 shows the 18 pole iron cores 22_1, 22_2, 22_3, 22_4, 22_5, 22_6, 22_7, 22_8, 22_9, 22_10, 22_11, 22_12, 22_13, 22_14, 22_15, 22_16, 22_17, 22_18. The iron cores 22_1 through 22_18 may be referred to simply as "iron core 22" if not identifying them individually.

FIG. 3 shows the coils 23_1 (U1), 23_2 (U2), 23_3 (U3), 23_4 (U4), 23_5 (U5), 23_6 (U6) serially connected by a crossover wire 24a, the coils 23_7 (V1), 23_8 (V2), 23_9 (V3), 23_10 (V4), 23_11 (V5), 23_12 (V6) serially connected by a crossover wire 24b, and the coils 23_13 (W1), 23_14 (W2), 23_15 (W3), 23_16 (W4), 23_17 (W5), 23_18 (W6) serially connected by a crossover wire 24c. The coils 23_1 through 23_18 may be referred to simply as "coil 23" if not identifying them individually. The crossover wires 24a, 24b, and 24c may in the same way be referred to simply as "crossover wire 24" if not identifying them individually.

In the coil structure shown in FIG. 3, the coils 23_1 (U1), 23_2 (U2), 23_3 (U3), 23_4 (U4), 23_5 (U5), 23_6 (U6) are the coils 23U wound in the U phase (first phase); the coils 23_7 (V1), 23_8 (V2), 23_9 (V3), 23_10 (V4), 23_11 (V5), 23_12 (V6) are the coils 23V wound in the V phase (second phase); and the coils 23_13 (W1), 23_14 (W2), 23_15 (W3), 23_16 (W4), 23_17 (W5), 23_18 (W6) are the coils 23W wound in the W phase (third phase). Here, U1 through U6, V1 through V6, W through W6 for 23U, 23V, 23W are utilized for purposes of convenience to identify each phase.

In the structures shown in FIG. 2 and FIG. 3, 18 coils 23_1 (U1), 23_2 (U2), 23_3 (U3), 23_4 (U4), 23_5 (U5), 23_6 (U6), 23_7 (V1), 23_8 (V2), 23_9 (V3), 23_10 (V4), 23_11 (V5), 23_12 (V6), coil 23_13 (W1), 23_14 (W2), 23_15 (W3), 23_16 (W4), 23_17 (W5), 23_18 (W6) can be respectively wound on the corresponding positions relative to the 18 pole iron cores 22_1 (U1), 22_2 (V1), 22_3 (W1), 22_4 (U2), 22_5 (V2), 22_6 (W2), 22_7 (U3), 22_8 (V3), 22_9 (W3), 22_10 (U4), 22_11 (V4), 22_12 (W4), 22_13 (U5), 22_14 (V5), 22_15 (W5), 22_16 (U6), 22_17 (V6), 22_18 (W6).

In other words, in regard to the U-phase, the coil 23_1 (U1) is wound on the iron core 22_1 (U1), and the coil 23_2 (U2) is wound on the iron core 22_4 (U2), and the coil 23_3 (U3) is wound on the iron core 22_7 (U3), and the coil 23_4 (U4) is wound on the iron core 22_10 (U4), and the coil 23_5 (U5) is wound on the iron core 22_13 (U5), and the coil 23_6 (U6) is wound on the iron core 22_16 (U6).

In regard to the V-phase, the coil 23_7 (V1) is wound on the iron core 22_2 (V1), and the coil 23_8 (V2) is wound on the iron core 22_5 (V2), and the coil 23_9 (V3) is wound on the iron core 22_8 (V3), and the coil 23_10 (V4) is wound on the iron core 22_11 (V4), and the coil 23_11 (V5) is wound on the iron core 22_14 (V5), and the coil 23_12 (V6) is wound on the iron core 22_17 (V6).

In regard to the W-phase, the coil 23_13 (W1) is wound on the iron core 22_3 (W1), and the coil 23_14 (W2) is wound on the iron core 22_6 (W2), and the coil 23_15 (W3) is wound on the iron core 22_9 (W3), and the coil 23_16 (W4) is wound on the iron core 22_12 (W4), and the coil 23_17 (W5) is wound on the iron core 22_15 (W5), and the coil 23_18 (W6) is wound on the iron core 22_18 (W6).

Figure 6:
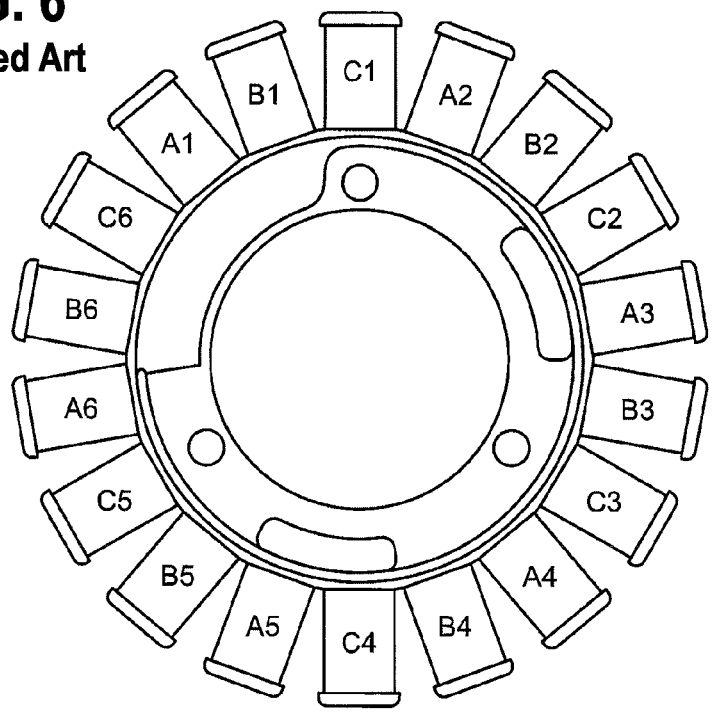
FIG. 6 shows the stator prior to winding the coil on the stator of the related art.
Figure 7:
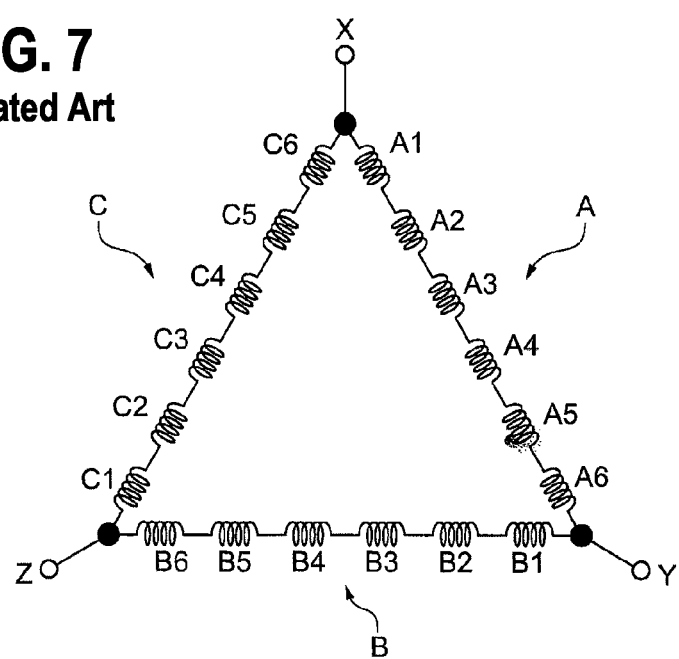
FIG. 7 shows the structure of the coil to be wound on the stator of the related art.
Figure 8B:
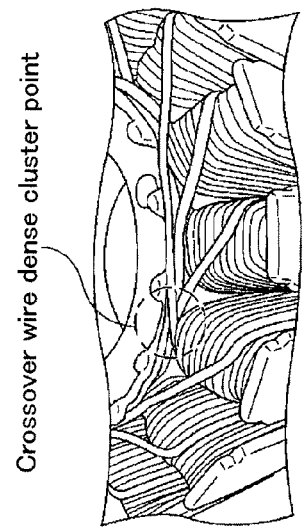
FIGS. 8A and 8B show the crossover wire for the coil of the stator utilized in the generator of the related art.
Figure 8A:
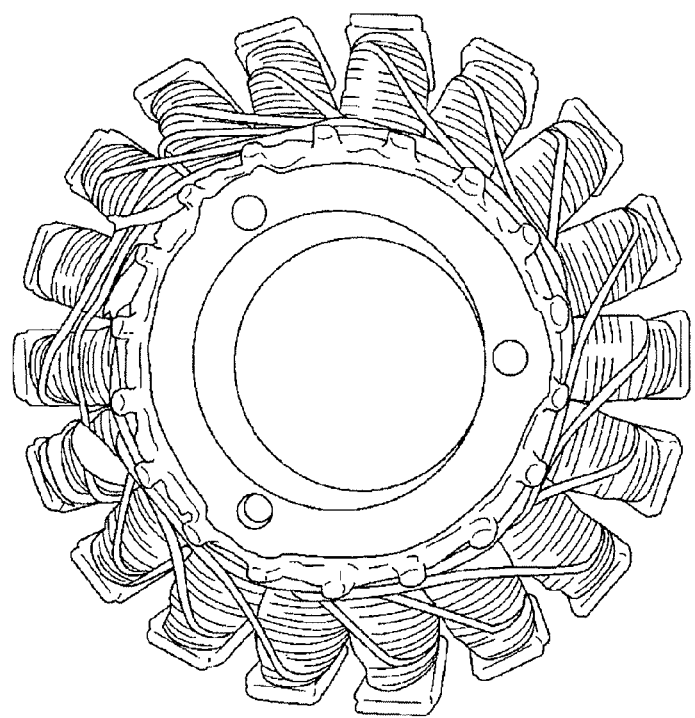
Figure 9A:
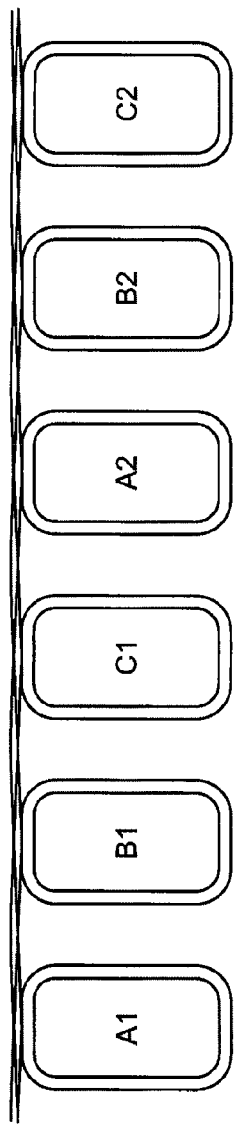
FIGS. 9A and 9B show the winding structure on the stator utilized in the generator of the related art.
Figure 9B:
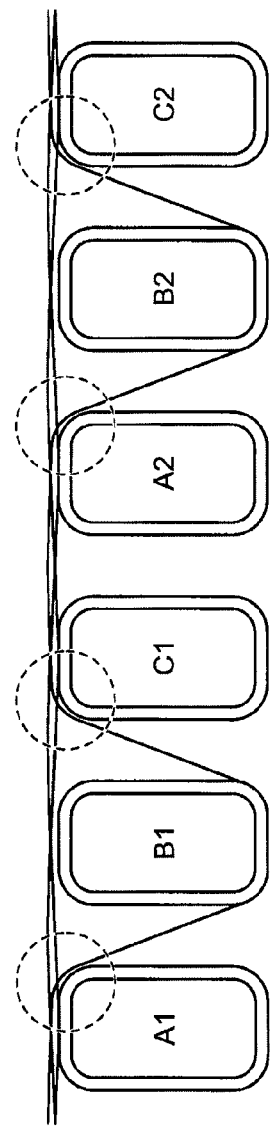

The position to wind the U-phase, V-phase, W-phase coils 23 on the iron cores 22 is in this way different only for the V-phase that is the middle phase. According to this configuration, the electrical characteristics of the terminals of the coil 23U, 23V, 23W for the U-phase, V-phase, and W-phase are the same as the stator 20 of the related art shown in FIGS. 6, 7 even if only the V-phase coil that is in the middle is wound in the reverse winding direction.

In the coil configuration shown in FIG. 3, the U-phase (first phase) 23U and the W-phase (third phase) coil 23W are wound in the same winding direction, and only the V-phase (second phase) coil 23V is wound in the reverse winding direction. The three-phase coils 23U, 23V, 23W are connected in a delta connection. In other words, the terminal U1 (first terminal) for the coil 23U wound in the U-phase (first phase) and the terminal W6 (second terminal) for the coil 23W wound in the W-phase (third phase) are connected at the contact point X; the terminal V6 (second terminal) for the coil 23V wound in the V phase (second phase) and the terminal U6 (second terminal) for the coil 23U wound in the U-phase (first phase) are connected at the contact point Y; and the terminal W1 (first terminal) for the coil 23W wound in the W-phase and the terminal V1 (first terminal) for the coil 23V wound in the V-phase are connected at the contact point Z.

On the stator 20 of the present embodiment, only the V-phase coil 23V that is in the middle among the three phases is wound in the reverse winding direction so that the V-phase coil 23V is arranged in the direction reverse to the contact point. In other words, the U-phase coil 23U and the V-phase coil 23V are connected to the terminal (second terminal) for the coil 23_6 (U6) and the terminal (second terminal) for the coil 23_12 (V6). The V-phase coil 23V and the W-phase coil 23W are connected to the terminal (first terminal) for the coil 23_7 (V1) and the terminal (first terminal) for the coil 23_13 (W1). The W-phase coil 23W and the U-phase coil 23U are connected to the terminal (second terminal) of the coil 23_18 (W6) and the terminal (first terminal) of the coil 231 (U1).

By winding only the V-phase coil 23V in the reverse winding direction in this way, the terminals for the coils wound on adjacent iron cores are connected at each of the contact points, X, Y, and Z. In other words, the terminals for the coils wound on the adjacent iron cores W6 and U1 are connected at the contact point X; the terminals for the coils wound on the adjacent iron cores U6 and V6 are connected at the contact point Y; and the terminals for the coils wound on the adjacent iron cores V1 and W1 are connected at the contact point Z. According to this structure, the terminals of the coils to be connected are placed in close physical proximity, which leads easy assembly and is advantageous for maintaining insulation.

On the stator 20 of the present embodiment, the crossover wires 24*a*, 24*c* for the U-phase and W-phase coils 23U, 23W are arranged on the same surface, and only the crossover wire 24*b* for the V-phase coil 23V is arranged on an opposite surface.

Figure 4:
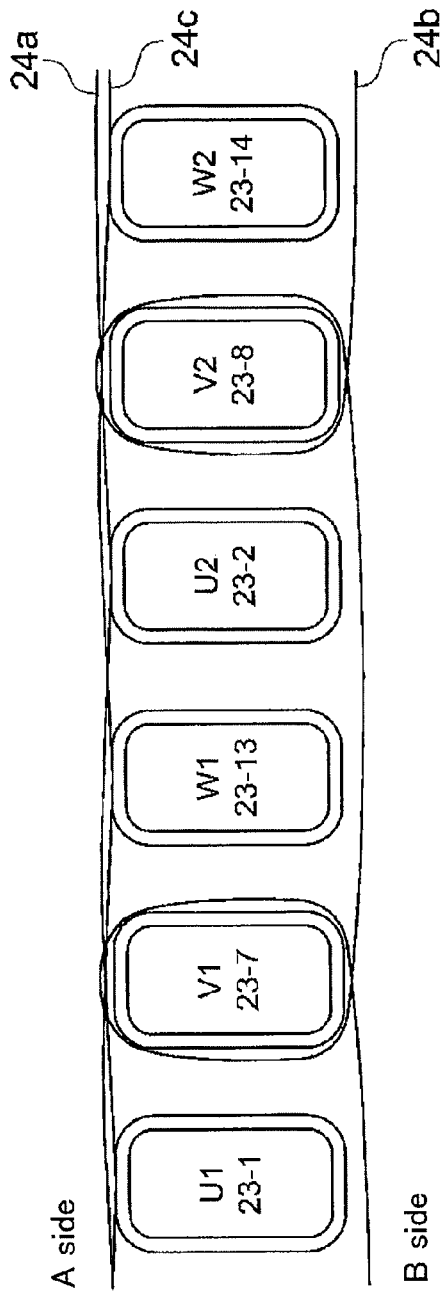
FIG. 4 shows an arrangement example of the crossover wire of the coil of the stator of the present embodiment.

FIG. 4 is a drawing showing an arrangement example of the crossover wire for the coil of the stator of the present embodiment.

FIG. 4 shows the crossover wire 24*a* for the U-phase coils 23_1 (U1), 23_2 (U2); the crossover wire 24*b* for the V-phase coils 23_7 (V1), 23_8 (V2); and the crossover wire 24*c* for the W-phase coils 23_13 (W1), 23_14 (W2). On the stator 20 of the present embodiment as shown in FIG. 4, the crossover wire 24*a* for the U-phase coil 23U and the crossover wire 24*c* for the W-phase coil 23W are arranged on the A side, and only the crossover wire 24*b* for the V-phase coil 23V is arranged on the B side positioned opposite the A side. Employing this structure ensures that no slanted crossover wire is formed, even if only the V-phase coil 23V is wound in the reverse winding direction to the other phase coils 23U, 23W. The crossover wire 24 in this way tends not to interfere with the winding of the other phase coils 23, and damage on the insulation coating is difficult to occur at the contact location with the crossover wire 24 for the other phase coils 23.

Furthermore, in the generator of the present embodiment, the three-phase coils 23 connected beforehand as a single coil at the contact points X, Y, Z may be wound on the iron core 22 rather than winding the coils 23 on the iron core 22 and connecting them at the contact points X, Y, Z after preparing the three-phase coils 23 to be wound on the stator as three separate coils.

In this case, first of all, the U-phase coil 23U can be wound in the sequence of U1-U2-U3-U4-U5-U6, next the V-phase coil 23V can be wound in the sequence of V6-V5-V4-V3-V2-V1, and the W-phase coil 23W can be wound in the sequence of W1-W2-W3-W4-W5-W6. Winding the coil 23 in this sequence allows easy winding. For winding, for example, a needle-type coil winder can be utilized.

FIGS. 5A-5C are drawings illustrating the winding structure on the stator for the generator of the present embodiment. FIG. 5A is a drawing showing an external view of the stator on which the coil is wound; FIG. 5B is a drawing showing an enlarged fragmentary external view of the A side; and FIG. 5C is a drawing showing an enlarged fragmentary external view of the B side.

As shown in FIGS. 5A-5C, in the stator 20 for the generator of the present embodiment, the crossover wire 24*a* for the U-phase coil 23U and the crossover wire 24*c* for the W-phase coil 23W are arranged on the A side; and the crossover wire 24*b* for the V-phase coil 23V is arranged on the B side. Therefore, even at a maximum there are two overlapping crossover wires 24, there is no need to depress the wires when there are limitations on the thickness or impregnate the coil with adhesive in manufacturing processes, which makes the winding easy.

In the embodiment shown in FIG. 5A, the A side includes a connection area for the contact points X, Y, Z where the two terminals for the U-phase coil 23U, the two terminals for the V-phase coils 23V, and the two terminals for the W-phase coils 23W are connected respectively; and for the lead wire connecting to an external section. Arranging the connection area for the contact points X, Y, Z and the lead wire connecting to an external section in this way on the A side where the two crossover wires 24*a*, 24*c* are arranged reduces the number of conducting wires that are utilized to span adjacent iron cores and reach connection points. However, this structure is not always required and the B side may include the connection area.

Extension of the Embodiment

Specific examples are described based on the embodiment of the invention as rendered by the inventors. However, it is understood that the present invention is not limited by these examples and modifications not departing from the scope of the invention are permissible.

In the above embodiments, a generator utilized as the rotating electrical machine is described as an example, however, the present invention is not limited to this example and other electrical rotating machines such as motors may also be utilized. If utilizing a motor as the electrical rotating machine, by applying an electrical current flow to the coil 23, the iron cores 22 are magnetized by an electromagnetic induction effect, to rotate the rotor 10 by attracting and repelling the magnet 12.

The description of the embodiments utilizes an example for the case where the first phase of winding is U-phase, the second phase of winding is V-phase, and the third phase of winding is the W-phase, however, the present invention is not limited to the above. The invention is further not limited to the sequence of first phase, second phase, third phase as the winding sequence.

The invention claimed is:

1. A rotating electrical machine, comprising:
    a stator including a stator body, a plurality of iron cores arranged along a circumference of the stator body, and a plurality of windings wound on each of the plurality of iron cores;
    a rotor including a plurality of permanent magnets arranged to have different magnetism along the circumference;
    the plurality of windings including a first phase winding, a second phase winding, and a third phase winding connected in a delta connection;
    the first phase winding, the second phase winding, and the third phase winding each connected in series with a respective crossover wire;
    wherein a winding direction of the first phase winding and a winding direction of the third phase winding is a first winding direction;
    wherein a winding direction of the second phase winding is a second winding direction, which is opposite the first winding direction;
    wherein a first crossover wire connecting the first phase winding is arranged on a first side of the stator;
    wherein a second crossover wire connecting the second phase winding is arranged on a second side of the stator disposed opposite the first side;
    wherein a third crossover wire connecting the third phase winding is arranged on the first side of the stator;
    wherein the first phase winding, the second phase winding, and the third phase winding each include a first terminal and a second terminal;
    wherein the first terminal of the serially connected first phase winding and the second terminal of the serially connected third phase winding are connected at a first contact point;

wherein the second terminal of the serially connected second phase winding and the second terminal of the serially connected first phase winding are connected at a second contact point;

wherein the first terminal of the serially connected third phase winding and the first terminal of the serially connected second phase winding are connected at a third contact point;

wherein the first contact point, the second contact point, and the third contact point are disposed on a connection area of an axial end face of the stator body, the axial end face of the stator body disposed on the first side of the stator;

wherein the plurality of iron cores includes a first iron core, a second iron core, a third iron core, a fourth iron core, and a fifth iron core disposed sequentially one after another, in that order, along the circumference;

wherein a first circumferential end of the connection area is disposed adjacent to a region between the first iron core and the second iron core; and wherein an opposite, second circumferential end of the connection area is disposed adjacent to a region between the fourth iron core and the fifth iron core.

2. The rotating electrical machine according to claim 1, wherein the rotating electrical machine is configured as a generator in which electromotive force is provided in the plurality of windings via rotation of the rotor.

3. The rotating electrical machine according to claim 1, further comprising a lead wire connected to an external section, wherein the lead wire is disposed at least partially in the connection area.

4. The rotating electrical machine according to claim 1, wherein the first contact point, the second contact point, and the third contact point are arranged between the first iron core and the fourth iron core relative to a circumferential direction.

5. The rotating electrical machine according to claim 1, wherein the first contact point, the second contact point, and the third contact point are arranged adjacent to the second iron core and the third iron core and are offset from the second iron core and the third iron core in a radial direction.

6. The rotating electrical machine according to claim 1, wherein the plurality of iron cores includes at least eighteen iron cores.

7. The rotating electrical machine according to claim 1, wherein a circumferential extent of the connection area is smaller than a circumferential extent spanned by five iron cores of the plurality of iron cores, the five iron cores arranged one directly after another along the circumference.

8. A stator, comprising:
a stator body;
a plurality of iron cores arranged along a circumference of the stator body;
a plurality of windings wound on each of the plurality of iron cores;
the plurality of windings including a first phase winding, a second phase winding, and a third phase winding connected in a delta connection;
the first phase winding, the second phase winding, and the third phase winding each connected in series with a respective crossover wire;
wherein a winding direction of the first phase winding and a winding direction of the third phase winding is a first winding direction;
wherein a winding direction of the second phase winding is a second winding direction, which is opposite the first winding direction;
wherein a first crossover wire connecting the first phase winding is arranged on a first side of the stator;
wherein a second crossover wire connecting the second phase winding is arranged on a second side of the stator disposed opposite the first side;
wherein a third crossover wire connecting the third phase winding is arranged on the first side of the stator;
wherein the first phase winding, the second phase winding, and the third phase winding each include a first terminal and a second terminal;
wherein the first terminal of the serially connected first phase winding and the second terminal of the serially connected third phase winding are connected at a first contact point;
wherein the second terminal of the serially connected second phase winding and the second terminal of the serially connected first phase winding are connected at a second contact point;
wherein the first terminal of the serially connected third phase winding and the first terminal of the serially connected second phase winding are connected at a third contact point;
wherein the first contact point, the second contact point, and the third contact point are disposed on a connection area of an axial end face of the stator body, the axial end face of the stator body disposed on the first side of the stator;
wherein the plurality of iron cores includes a first iron core, a second iron core, a third iron core, a fourth iron core, and a fifth iron core disposed sequentially one after another, in that order, along the circumference;
wherein a first circumferential end of the connection area is disposed adjacent to a region between the first iron core and the second iron core; and
wherein an opposite, second circumferential end of the connection area is disposed adjacent to a region between the fourth iron core and the fifth iron core.

9. The stator according to claim 8, further comprising a lead wire connected to an external section, wherein the lead wire is disposed at least partially in the connection area.

10. A stator, comprising:
a stator body;
a plurality of iron cores arranged along a circumference;
a plurality of crossover wires; and
a plurality of windings wound on each of the plurality of iron cores, the plurality of windings including a first phase winding, a second phase winding, and a third phase winding connected in a delta connection;
wherein the first phase winding, the second phase winding, and the third phase winding are each connected in series with a respective crossover wire of the plurality of crossover wires;
wherein the plurality of crossover wires includes i) a first crossover wire connecting the first phase winding, ii) a second crossover wire connecting the second phase winding, and iii) a third crossover wire connecting the third phase winding;
wherein a winding direction of the first phase winding and a winding direction of the third phase winding is a first winding direction;
wherein a winding direction of the second phase winding is a second winding direction, which is opposite the first winding direction;
wherein the first crossover wire and the third crossover wire are arranged on a first side of the stator;

wherein the second crossover wire is arranged on a second side of the stator disposed opposite the first side;

wherein the plurality of windings and the plurality of crossover wires are portions of a single coil;

wherein the first phase winding, the second phase winding, and the third phase winding each include a first terminal and a second terminal;

wherein the first terminal of the first phase winding and the second terminal of the third phase winding are connected at a first contact point;

wherein the second terminal of the second phase winding and the second terminal of the first phase winding are connected at a second contact point;

wherein the first terminal of the third phase winding and the first terminal of the second phase winding are connected at a third contact point; and wherein the first contact point, the second contact point, and the third contact point are disposed on a connection area of an axial end face of the stator body, the axial end face of the stator body disposed on the first side of the stator;

wherein the plurality of iron cores includes a first iron core, a second iron core, a third iron core, a fourth iron core, and a fifth iron core disposed sequentially one after another, in that order, along the circumference;

wherein a first circumferential end of the connection area is disposed adjacent to a region between the first iron core and the second iron core; and wherein an opposite, second circumferential end of the connection area is disposed adjacent to a region between the fourth iron core and the fifth iron core.

11. The stator according to claim 10, wherein:

the plurality of iron cores further includes a sixth iron core, a seventh iron core, an eighth iron core, a ninth iron core, a tenth iron core, an eleventh iron core, a twelfth iron core, a thirteenth iron core, a fourteenth iron core, a fifteenth iron core, a sixteenth iron core, a seventeenth iron core, and an eighteenth iron core disposed sequentially one after another, in that order, along the circumference;

the single coil is wound sequentially around the first iron core, the fourth iron core, the seventh iron core, the tenth iron core, the thirteenth iron core, the sixteenth iron core, the seventeenth iron core, the fourteenth iron core, the eleventh iron core, the eighth iron core, the fifth iron core, the second iron core, the third iron core, the sixth iron core, the ninth iron core, the twelfth iron core, the fifteenth iron core, and the eighteenth iron core in that order.

12. The stator according to claim 11, wherein the single coil includes:

a first phase portion defining the first phase winding, the first phase portion wound around the first iron core, the fourth iron core, the seventh iron core, the tenth iron core, the thirteenth iron core, and the sixteenth iron core;

a second phase portion defining the second phase winding, the second phase portion wound around the second iron core, the fifth iron core, the eighth iron core, the eleventh iron core, the fourteenth iron core, and the seventeenth iron core; and a third phase portion defining the third phase winding, the third phase portion wound around the third iron core, the sixth iron core, the ninth iron core, the twelfth iron core, the fifteenth iron core, and the eighteenth iron core.

13. The stator according to claim 10, wherein the first contact point, the second contact point, and the third contact point are arranged between the first iron core and the fourth iron core relative to a circumferential direction.

14. The stator according to claim 13, wherein the first contact point, the second contact point, and the third contact point are arranged adjacent to the second iron core and the third iron core and are offset from the second iron core and the third iron core in a radial direction.

15. The stator according to claim 13, wherein the plurality of iron cores includes at least eighteen iron cores.

16. The stator according to claim 10, wherein a circumferential extent of the connection area is smaller than a circumferential extent spanned by five iron cores of the plurality of iron cores, the five iron cores arranged one directly after another along the circumference.

\* \* \* \* \*